Oct. 17, 1950     W. H. DARLINGTON     2,526,122
COMBUSTION CHAMBERS WITH PERFORATED END WALLS AND
UPSTREAM FUEL INJECTION FOR COMBUSTION TURBINES
Filed Sept. 30, 1946

INVENTOR
William Henry Darlington
By Ravish Bateman
ATTORNEYS

Patented Oct. 17, 1950

2,526,122

UNITED STATES PATENT OFFICE 2,526,122

COMBUSTION CHAMBERS WITH PERFORATED END WALLS AND UPSTREAM FUEL INJECTION FOR COMBUSTION TURBINES

William Henry Darlington, Stretford, England, assignor to Metropolitan-Vickers Electrical Company Limited, London, England, a company of Great Britain Application September 30, 1946, Serial No. 700,323
In Great Britain November 28, 1944

Section 1, Public Law 690, August 8, 1946
Patent expires November 28, 1964

3 Claims. (Cl. 60—44)

1

This invention relates to internal combustion turbine plant and in particular to combustion chambers therefor in which fuel issuing from one or more jets is burned in the presence of compressed gaseous fluid, which is usually air and is herein generally referred to as such, to provide gaseous working fluid for the internal combustion turbine.

In such plant it is customary to arrange for the gaseous products of combustion of the fuel jet with pressure air in a primary combustion chamber or zone to be mixed with pressure air in a secondary combustion chamber zone with a view to prevention of unburnt fuel leaving the combustion chamber at the downstream end, that is at the end opposite to that at which pressure air is admitted, and to cool the mixture to a temperature that can be safely used in the turbine. Where the so-called upstream method of fuel injection is employed, that is where the fuel jet is directed oppositely to the direction of air flow, it is also necessary to ensure that no unburnt liquid fuel be allowed to pass out through the passage for the incoming pressure air entering the primary chamber and to prevent the accumulation of unburnt fuel which may impinge on the wall of the primary chamber facing the fuel jet and its fall by gravity to the bottom of the chamber, by ensuring effective entrainment with the incoming air and its burning in the primary chamber.

With the above and other considerations in view, according to the present invention, at the upstream end of the combustion chamber or zone in which primary combustion is effected there is provided an end-closure or baffle having a solid, imperforate, central portion opposite the fuel jet and at least one row, but preferably several rows, of circularly distributed perforations surrounding said imperforate portion. In use, it is contemplated that no part of the fuel will strike any portion of the end-closure or baffle other than the central imperforate portion and, with the pressure air passing through the perforations surrounding this central imperforate portion, any unburned fuel which may tend to collect at the end-closure or baffle will be dispersed under the circulating action of the incoming air, or in tending to gravitate past the row or rows of perforations will become entrained with the pressure air entering the chamber or combustion zone through said perforations.

In practising the invention, it is preferred to provide a band consisting of several rows of perforations surrounding the central imperforate

2 portion, with the individual perforations in the rows suitably staggered so as to render it substantially impossible for any liquid fuel to creep beyond the band of perforations.

Advantageously, the axes of the individual perforations may be inclined to the axis of the end-closure or baffle with a view to introducing to the incoming air a swirling motion thus to facilitate the proper mixing of the hot gases in the combustion chamber.

It will be appreciated that the invention is equally applicable whether the combustion chamber combustion is of the so-called flame-tube type or of the so-called annular type. In the case of the flame-tube construction, the end-closure for each flame-tube may conveniently be constituted by a plate conforming to the cross-section of the flame tube and provided as described with a central imperforate portion and a surrounding band of perforations; in the case of the annular construction, the end-closure may be constituted by an annular plate having a plurality of imperforate portions circularly distributed correspondingly with the respective jets and each surrounded by a band of perforations as described.

In order that the invention may be fully understood and carried into effect reference is made to the accompanying diagrammatic drawing, in which—

Figure 3 is an end view of the chamber of Fig. 2 for the construction in which the chamber is of tubular form, while

Figure 3:
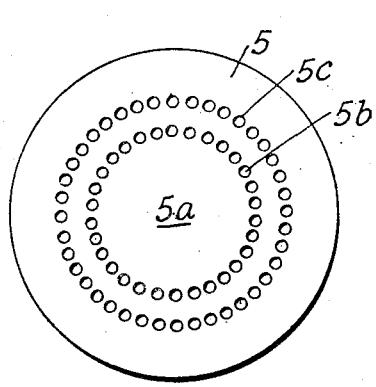
Figure 2:
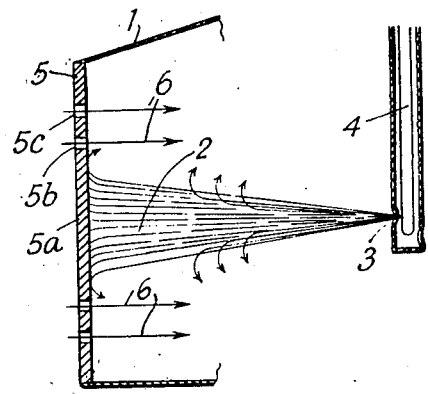
Figure 2 is an axial sectional view on an enlarged scale, of part of a combustion chamber arranged in accordance with the invention.
Figure 1:
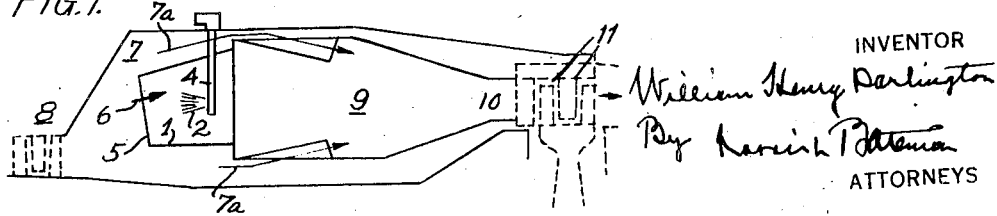
Figure 1 is a diagrammatic half axial sectional view of combustion chambers and an associated axial flow compressor and axial flow turbine of an internal combustion turbine plant embodying the present invention.

Referring to Figs. 1, 2 and 3, at 1 is indicated the circumferential wall of a casing forming a tubular primary combustion chamber disposed with its tubular axis extending substantially horizontally. This chamber is intended for the combustion with air or equivalent compressed gaseous fluid supplied by compressor 8, of liquid fuel issuing in a jet 2 from an orifice 3 in a jet-pipe 4 extending radially into this chamber so that the orifice 3 is located substantially at the axis of the chamber. At one end, namely through which the pressure air or fluid is introduced, the chamber is fitted with an end-closure comprising a plate or disc 5 which is disposed with its general plane substantially vertical and is suitably sealed peripherally to the tubular wall 1. The primary combustion chamber is surrounded by an annular duct 7 which also surrounds a secondary combustion chamber 9 suitably closed at its downstream end and furnished with suitable outlet means 10 affording passage of the gaseous products of combustion to an internal combustion turbine 11, the products of combustion from the primary combustion chamber discharging therefrom into the second combustion chamber which in turn discharges into the internal combustion turbine, and secondary air streams 7a from the duct 7 are introduced into the secondary combustion chamber to mix therein with the gaseous products of combustion from the primary combustion chamber.

It is to be noted that the jet-pipe 4 is disposed downstream and arranged for directing the jet upstream, with respect to the flow of pressure air or fluid into the chamber.

Essentially the end-closure 5 is formed with a solid imperforate central portion 5a adapted to face the jet 2 and of surface area sufficient wholly to intercept the jet 2. Surrounding the imperforate portion 5a is an inner row of circularly-distributed perforations 5b and an outer row of circularly-distributed perforations 5c. The perforations 5b and 5c, as well as others which might be provided in the end-closure 5 so as to surround said perforations 5b, 5c are intended for the admission of the pressure air or equivalent gaseous fluid to the chamber in opposite direction to that of the jet 2, the streams of admitted air or fluid being indicated by the arrows 6; with these perforations disposed out of the path of the jet, the possibility of leakage of unburnt fuel through this end of the chamber is minimised. Preferably, individual perforations in the rows 5b and 5c and any other rows which might be provided, are arranged so that any fuel from the jet 2 which may collect on the end-closure 5 and gravitate over the vertical surface thereof must be intercepted by a stream of air or fluid entering the chamber through at least one of the perforations. It is also desirable for the perforations 5b and 5c to be formed with their axes inclined to the tubular axis of the chamber so that a swirling effect will be imposed upon the streams of incoming air or gaseous fluid 6 tending to improve the mixing of the combustible gases, and thus the extent of combustion.

Instead of the combustion chamber being of tubular form as just described, it may be of annular form having an outer circumferential wall and an inner circumferential wall replacing the tubular wall 1 of Fig. 2. The chamber, which will be disposed with its annular axis substantially horizontal, is closed at the upstream end by an annular plate or disc as indicated in part at 15 in Fig. 4. Fuel jets similar to the jet 2 (Fig. 2) will be arranged to issue from jet-pipes 4a similar to jet-pipe 4 (Fig. 2) but circularly distributed around the axis of the annulus.

The end-closure 15 is formed with a plurality of solid imperforate portions 15a circularly distributed around the axis of the annulus correspondingly with the circular distribution of the jets. These imperforate portions of the end-closure 15 are surrounded each by inner and outer rows of circularly-distributed perforations 15b and 15c respectively and further perforations 15d and 15e are formed in the end-closure at intervals circularly distributed around the axis of the annulus, all these perforations being intended to pass streams of pressure air or equivalent gaseous fluid into the chamber.

For the annular construction of chamber it is contemplated that the solid imperforate portions of the end-closure 15 will wholly intercept the respective jets and any fuel which may collect on the end-closure and gravitate across the vertical surface thereof must be intercepted by a stream of air or gaseous fluid entering the chamber through at least one of the perforations.

Figure 4:
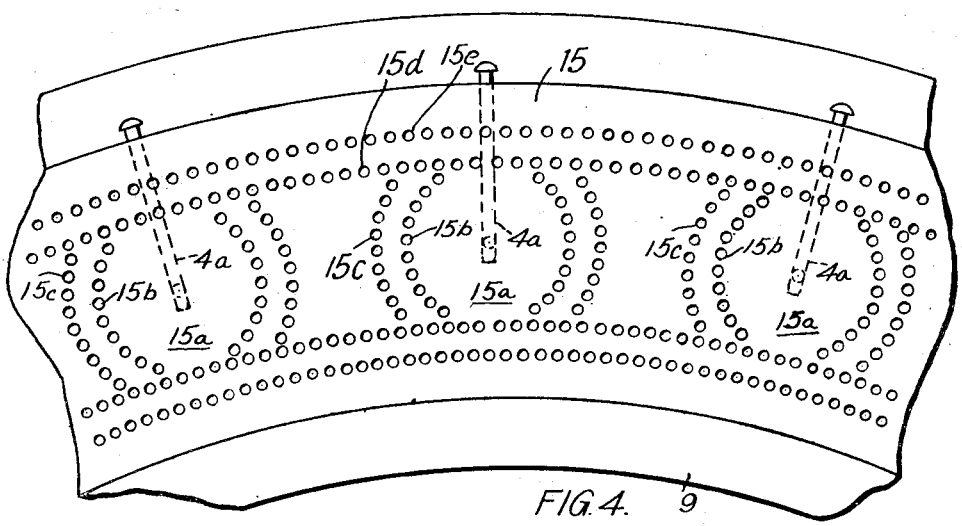
Figure 4 is a fragmentary end view of the chamber of Fig. 2 for the construction in which said chamber is of annular form.

It will be appreciated that for both the tubular and annular constructions of combustion chamber, the upstream end of the chamber may be closed, and the desired effects obtained by installation of a baffle plate, similar in construction and arrangement to the end-closure plates 5 and 15 of Figs. 3 and 4, between said upstream end of the chamber and the fuel jet or jets directed theretowards, the pressure air or gaseous fluid being admitted in any suitable manner to the space between the upstream end-closure and the baffle and passing through the perforations in the baffle into the regions around the jet or jets.

What I claim as new and desire to secure by Letters Patent of the United States is:

1. A fuel burning arrangement for an internal combustion turbine plant, comprising a duct, a casing forming a combustion chamber within said duct, means for inducing an air stream through said duct, said casing having a closure member at its upstream end formed with inner and outer rows of circularly distributed apertures forming primary air inlets to said combustion chamber and an imperforate central portion within the inner row of apertures, and a plurality of inlets for secondary air at its downstream end, and a fuel pipe extending into said combustion chamber having a nozzle directed to spray fuel in an upstream direction towards the imperforate portion at the center of the inner row of circularly distributed apertures.

2. A fuel burning arrangement for an internal combustion turbine plant having a casing forming intercommunicating primary and secondary combustion chambers and a duct surrounding said chambers, and means for inducing flow of a stream of air through the duct, comprising a closure member at the upstream end of the primary combustion chamber and provided with an imperforate portion and a plurality of rows of apertures distributed circularly around said imperforate portion and forming primary air inlets from the duct to the primary combustion chamber, said apertures having their axes inclined to the axis of the primary combustion chamber, the secondary combustion chamber having air inlets thereto directed downstream from the duct for admission of secondary air streams to the secondary combustion chamber, and a fuel nozzle in the primary combustion chamber directed upstream toward the imperforate portion within the inner row of circularly distributed apertures in said closure member.

3. A fuel burning arrangement for an internal combustion turbine plant, comprising a casing having therein an annular primary combustion chamber, a secondary combustion chamber connected to receive products of combustion from the primary combustion chamber, means for inducing flow of a stream of air through the casing, a plurality of fuel nozzles circularly distributed in the primary combustion chamber about the axis thereof and directed upstream, an annular closure member at the upstream end of the primary combustion chamber having a plurality of circularly distributed imperforate portions in alinement with the jets from the respective fuel nozzles and at least one row of perforations distributed around each of said imperforate portions for the admission of primary air from the stream to the primary combustion chamber, and means for supplying secondary air from the stream to the secondary combustion chamber downstream from the fuel nozzles.

WILLIAM HENRY DARLINGTON.

REFERENCES CITED

The following references are of record in the file of this patent:

UNITED STATES PATENTS

| Number | Name | Date |
| --- | --- | --- |
| 1,542,294 | Fogler | June 16, 1925 |
| 1,819,181 | Klein | Aug. 18, 1931 |
| 1,847,020 | Parket et al. | Feb. 23, 1932 |
| 1,983,386 | Mikeska | Dec. 4, 1934 |
| 2,072,731 | Crosby | Mar. 2, 1937 |
| 2,404,335 | Whittle | July 16, 1946 |